J. M. W. KITCHEN.
METHOD OF MAKING AND PRESERVING BUTTER.
APPLICATION FILED AUG. 29, 1910.
1,026,918.
Patented May 21, 1912.
2 SHEETS—SHEET 1.
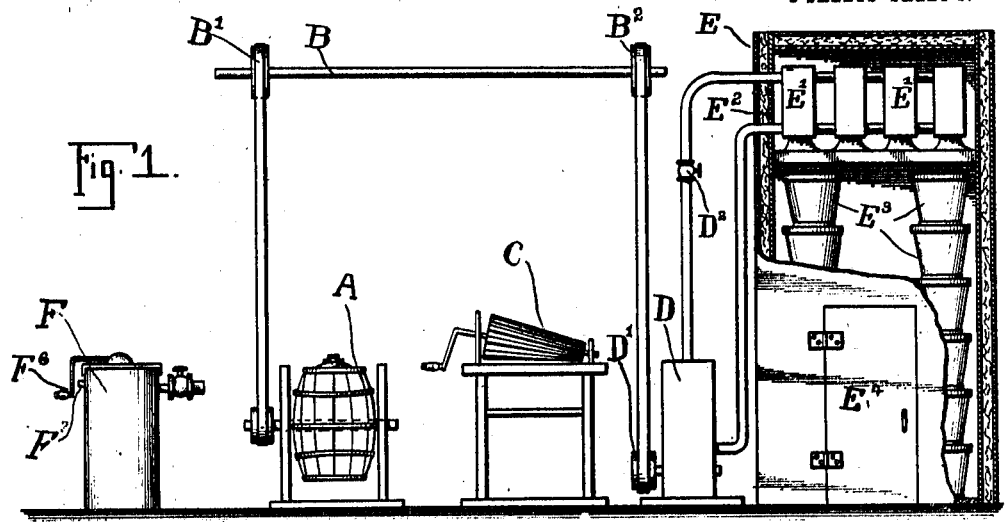
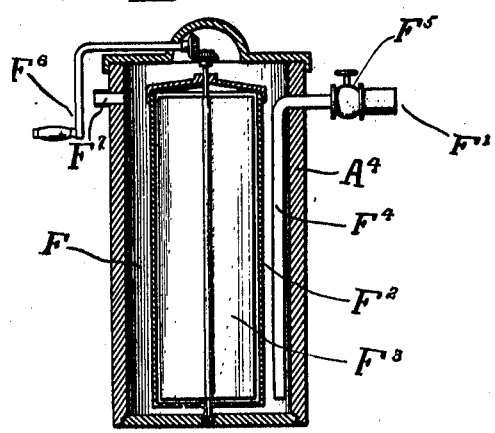
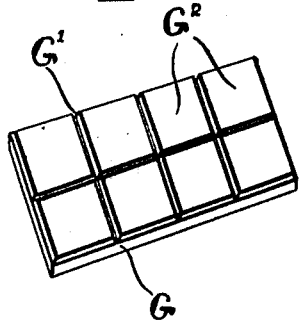
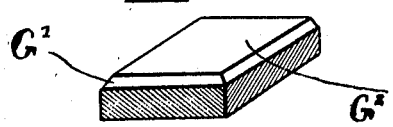
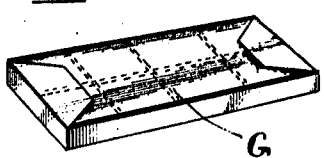
Attest:
Raymond Richardson.
Nathan Epstein
Inventor:
J. M. W. Kitchen
by Geo. L. Wheelock
Atty J. M. W. KITCHEN.
METHOD OF MAKING AND PRESERVING BUTTER.
APPLICATION FILED AUG. 29, 1910.
1,026,918.
Patented May 21, 1912.
2 SHEETS—SHEET 2.
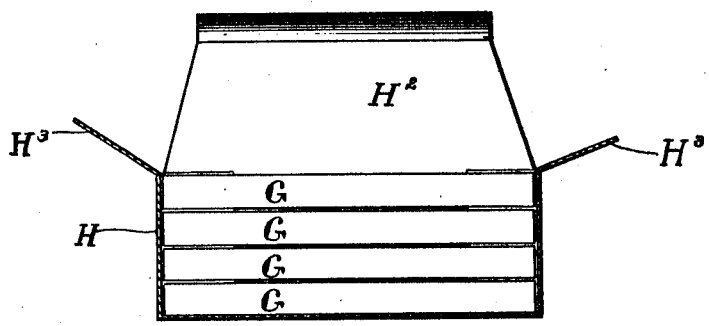
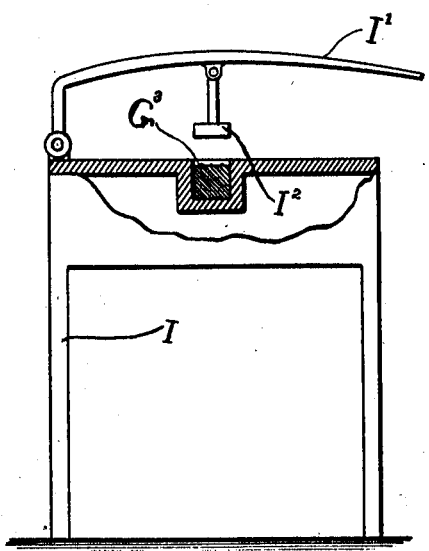
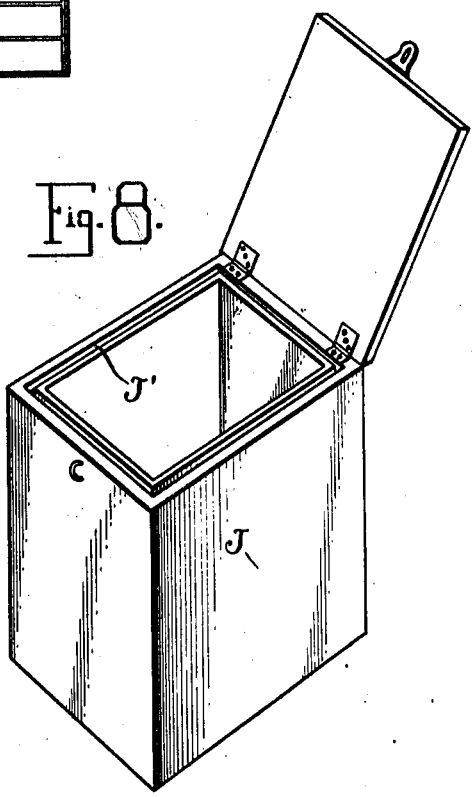

UNITED STATES PATENT OFFICE.

JOSEPH MOSES WARD KITCHEN, OF EAST ORANGE, NEW JERSEY.

METHOD OF MAKING AND PRESERVING BUTTER.

1,026,918.  Specification of Letters Patent.  Patented May 21, 1912.

Application filed August 29, 1910. Serial No. 579,538.

*To all whom it may concern:*

Be it known that I, JOSEPH MOSES WARD KITCHEN, a citizen of the United States, residing in the city of East Orange, county of Essex, State of New Jersey, have invented an Improved Method of Making and Preserving Butter, of which the following is a specification.

The object of this invention is to be able to supply butter to consumers in towns and cities at a considerable distance from the places of milk production and of butter manufacture, in the best possible condition as to quality. Milk and its contained butter fat are very perishable food products, and rapidly deteriorate in quality immediately after production, under ordinary conditions of handling. If the milk and cream from which butter is made, is properly treated, the butter comes from the churn delicious as to fragrance and as to flavor; but usually is considerably infected with germs which proliferate at the temperatures at which freshly produced milk and butter are usually kept and made; and which even at the cold temperatures maintained by icing, soon develop objectionable flavors, which injure the fine qualities of freshly made butter, whether fermented or unfermented, salted or unsalted. Consumers in the cities as a rule, never taste a really fine quality of freshly made butter, as most of the butter sold is more or less spoiled before it reaches the storage warehouses in the cities, or is sold to the consumer. Furthermore, after the butter reaches the consumer, it usually still more rapidly deteriorates, owing to a progressive fermentation in it, and due to the absorption of objectionable odors and flavors; and also because of infection from the atmosphere and from germ contaminated knives or other utensils used in excavating the butter from the butter package, or used in dividing the ordinary sized and shaped butter print. A small amount of really fine so-called "gilt-edged" butter, reaches the cities and is there sold. This quality of butter is produced at a very high cost in preventing infection of the milk, cream and butter at the farm, and butter factory.

My method enables the butter maker to secure satisfactory results from the use of cream made from milk produced under ordinary conditions as to cleanliness in the farmers' barn where ordinary provision is made for the care of cattle and the milk produced, and in which case, the milk receives a very considerable germinal infection at the time of its production. My method prevents the development of the germs from that infection before great deterioration in quality has occurred. So far as the extent of infection of the butter made by the two processes is concerned, at the time of the consumption of the butter there is no material difference. In the case of the high cost butter, germinal proliferation occurs after the making of the butter. In my method I prevent fermentation immediately after the making of the butter.

The methods I apply in this invention to secure the aimed for results, are to cool the cream, which should be separated from the milk immediately after it is drawn from the cow, to a temperature that will prevent objectionable fermentation in the milk prior to its churning. In practice it has been found that the separated cream may be kept at a temperature of about 60° F. prior to its churning, if the cream is collected and churned at least every forty-eight hours. Then I refrigerate the butter immediately after it is made to so low a temperature that undesired bacterial proliferation in the butter is immediately prevented. I prefer mechanically produced refrigeration in carrying out my method, inasmuch as the preferred temperature can be more conveniently and economically produced than through chemical refrigeration. Furthermore, I have so far, found it impractical to secure a sufficiently low temperature with salt and ice mixtures. But mechanical refrigeration is conveniently effected by means of the co-action of a gasolene engine, ammonia compressor and a special arrangement of brine tanks. In some cases, as in small individual dairies, on account of the cost of mechanical refrigerating apparatus, chilling the newly made butter by the use of a salt and ice mixture may be practiced, especially when the butter is marketed in a closely adjacent community; but mechanical refrigeration is to be preferred. Preferably, the cream should be immediately chilled after a mechanical separation from the milk, the separation being effected while the milk retains its animal heat; and then the cream should be held at or near to a non-fermentative temperature until transported to the place of its manufacture into butter, after which the cream can be then fermented under adequate control as to surroundings and temperature. But under certain conditions in which temperature can be well controlled at the place where the cream is produced, a partial fermentation of the cream may be allowed prior to its transportation to the butter making plant. The butter after its manufacture is always immediately cooled to and held at a sufficiently low temperature to substantially prevent all fermentative changes in it until favorable opportunities for its selling and consumption occur. The temperature most favorable is from 6° F. to zero; but I also usually chill the butter so much as to maintain a sufficiently low temperature in the butter during the shipment of the butter, when more or less absorption of heat by the butter occurs. I do not limit myself to this particular temperature. There is no data in existence which indicates the special temperature required under various conditions to bring the fermentative process to a standstill. It is obvious that the depth of temperature required would vary according to a number of conditions, including the fermentative changes that have occurred in the cream before and during its churning, and while the butter is being made. As a matter of precaution, I refrigerate the butter to a temperature many degrees below that secured by icing. The temperatures secured from icing do not prevent more or less objectionable fermentative changes in the butter. As I usually not only refrigerate sufficiently to prevent fermentation, but also make the butter sufficiently cold to prevent any fermentation during its conveyance to market, or to the large storage warehouses of the cities, which for commercial convenience must be located close to the points of distribution; and as the distance from the point of production to the point of consumption, may vary widely, it will be obvious that the temperature required will vary according to the season, outward atmospheric conditions and the heat to be met in the car or other vehicle in which the butter is conveyed to market. I find for practical purposes, mechanical refrigeration is almost universally essential to my method.

When the butter is to be stored for a considerable time, it is usually shipped in packages weighing ten pounds and over; but where the butter is to be immediately consumed, it is made into prints of a form in which each print as ordinarily made, is subdivided into thin slabs and prints of a thickness and size suitable for individual use at the table, each slab being impressed on its surface with recesses which indicate and partly divide the slabs into ordinary size butter patties, the face of each patty bearing some characteristic imprint, and usually a recessed imprint, which form allows of more compactness in the method of packing that I use to prevent infection of the butter. This method is as follows: Each slab is wrapped in paraffin paper and a plurality of the thin and partly divided wrapped slabs are packed in a paraffin coated pasteboard carton. The butter before being finally packed, is subjected to a very low degree of cold, usually to or near to zero, and always very considerably below 32° F., which low temperature is usually secured through mechanical refrigeration. The cartons are packed in considerable numbers to secure a very low degree of refrigeration in the package in which the butter is shipped to market. These packages are specially insulated; and preference is given to compressed sheets of cork as an insulating material for the packing cases. The consignee holds the butter in low refrigeration, and after its distribution to the consumer, the individual cartons are kept in the consumers' refrigerator, and the individual enwrapped slabs are only removed from the carton as needed for table use. In this method it will be seen that the butter is not touched by hand or infected utensil, nor is exposed to atmospheric infection from the time it leaves the manufacturer until its consumption at the table, is immediately assured.

Inasmuch as the butter after churning is immediately subjected to so low a degree of refrigeration as to prevent substantially all fermentation in it, this method enables the farmer to make much of his butter on cheap spring and summer pasture feeds, and yet allows the butter to be held in good condition for favorable prices at those seasons of the year when more expensive feeds would have to be fed to the cows in order to secure a large product at those seasons.

In particular cases where the butter after its manufacture is to be conveyed unusually long distances, and where its consumption is unusually delayed, I pasteurize the milk or cream, and ferment the cream with a special culture starter before churning. But if possible, I prefer to churn unpasteurized cream ripened in the ordinary manner, as in this case it is more convenient for the farmer to hold the cream, and costs the butter-maker less to collect and transport the cream from the farm to the butter factory because of less frequent collections of the cream being required. Unpasteurized cream produces a butter that is usually preferred by consumers. If pasteurization is practiced, the cream must be kept sweet or nearly so, at its place of production, and must be more frequently collected. In case the plan of refrigerating the cream is adopted, some simple method of cooling the cream is adopted, as by ordinary icing or through the use of a large amount of cold water.

It is common to refrigerate butter in storage at low temperatures, but only after more or less deterioration from objectionable fermentation has occurred, and after transportation to or close to the place of its distribution and consumption.

My method is to immediately after separation of the cream, and after churning the cream, and while the product is still in finest condition, to immediately refrigerate the butter to the low temperature that will prevent the deterioration. I again repeat, that a temperature that can be secured by the ordinary methods of icing, is not low enough to be sufficiently effective.

In the drawings: Figure 1 represents diagrammatically in elevation, and partly in section, the principal elements in a dairy house. Fig. 2 represents on a larger scale in elevation, and partly in section, a pasteurizing device. Fig. 3 represents a thin printed slab of butter. Fig. 4 represents an individual butter patty. Fig. 5 represents a thin butter slab wrapped in paraffin paper. Fig. 6 represents a pound package of four separately wrapped butter slabs. Fig. 7 represents partly in section, a lever butter printer. Fig. 8 represents an insulated butter carrier.

A is a churn, B is a power shaft which may be actuated by any convenient source of power.

$B^1$ is a pulley which actuates the churn, C is a butter worker, D is a compressor for the mechanical compression of ammonia gas, $D^1$ is a pulley actuating the compressor D which is driven by the shaft B and the pulley $B^2$.

E is an insulated refrigerator, $E^1$ are cold brine tanks, $E^2$ is an insulating casing, $E^3$ are packages of butter under refrigeration, $E^4$ is a door, $D^2$ is a valve through which the compressed ammonia is allowed to expand.

Fig. 2 represents on a larger scale the pasteurizer F shown in Fig. 1, having an insulated external receptacle $A^4$, an internal cream receptacle $F^2$, a revolving stirrer $F^3$, and a hot water pipe $F^4$. $F^5$ is a valve. $F^6$ is a handle for actuating the stirrer $F^3$, and $F^7$ is an outlet for the hot water which is introduced through the pipe $F^1$.

G represents a thin printed slab of butter having the individual butter pats $G^2$ and depressions or creases $G^1$.

In Fig. 4 is represented an individual butter pat which has been divided at the creases $G^1$ from the slab G.

In Fig. 6 is represented a package of four separately enwrapped butter slabs enveloped in a paraffined protective carton H having the folding flap $H^2$ and the side flaps $H^3$. The lever butter printer I, has the lever $I^1$, the press block $I^2$, and the print block $G^3$ from which the thin slabs receive their imprint.

J is an insulated butter carrier having the insulating air spaces $J^1$.

I wish to emphasize in particular, my method of forming the butter into thin slabs and imprinting them in such manner that each slab is formed and partly divided into a plurality of pieces or patties of a size and form suitable for use by the individual at table, and then enwrapping each thin slab protectively, so that the butter when purchased for consumption need not be opened to the atmosphere nor touched by any implement until immediately prior to the consumption of the butter at table. In the ordinary method of forming butter in prints, and enwrapping the same, butter is divided into larger prints, weighing not less than one-half pound each, in which case, the entire print is either placed on the table and each individual removes a portion of butter from the unitary print, or else the butter is formed into some special form of butter patty, and in either case the butter becomes atmospherically infected with germs; and if as is usually the case, portions of the original prints are unconsumed, rapid deterioration of the unconsumed portions ensues.

My method of subdivision is an improvement on older methods in that much deterioration is largely prevented, whether the butter is subjected to intensely low refrigeration or not. But I lay stress on the value of immediate low refrigeration of the butter after it is made to or so near to a temperature, such as between zero and six degrees F., that proliferation of bacteria in the butter is substantially prevented. If the butter is stored in bulk before it is formed into the specially described slabs, it is kept at the stated low temperature, and is again intensely refrigerated after being formed into the thin slabs and the enwrapping of the slabs. If the butter finds a market and quick consumption near at hand, the refrigeration of the butter before and after the peculiar packing I practice, need not be so intense. In such instances the cooling of the butter need not be more than is necessary to enable the thin slabs to be conveniently formed and their shape maintained while being enwrapped and conveyed to the consumer at table; but whenever the convenient method of mechanical refrigeration is available, it is better to reduce the temperature considerably below 32° F.

Inasmuch as it is important to deeply refrigerate the butter as quickly as possible after it is churned, the value of my method of sub-dividing the usual size prints into thin slabs will be obvious, as in that case the butter will be more completely and quickly chilled than if the prints were of the usual size, or if the butter were cooled in larger masses by the usual icing process. When the butter is to be stored for a considerable time, it is better to pack it in small size packages rather than in larger size packages, for the larger the size of the mass in which the butter is left after its churning, the longer will be the time required to completely chill the entire mass, and even a few hours' delay in cooling the butter sufficiently, means some deterioration in the quality of the butter. Hence, to secure the very finest quality of the butter to deliver to the consumer, it is desirable to form it into the thin slabs, and chill the slabs quickly to a very low temperature, after which the slabs can be wrapped singly and then placed in the cartons preliminary to the final packing for shipment in insulated cases. When car loads of butter are to be shipped to market during the cooler weather, merely deep refrigeration of the butter at the butter factory is all that is needed to prevent objectionable heating of the butter while in transit.

My method is of value even in case of pasteurized butter where presumably no live germs exist in the center of the pasteurized butter mass; for in my experimentation I have found that without deep and immediate refrigeration of the pasteurized butter, molds are likely to form on the surface of the butter mass and penetrate inwardly, infection occurring from the surface of the butter package or from the atmosphere during the packing of the butter.

By handling milk, cream and butter in the manner thus described, butter can be made, conveyed and distributed to consumers in a practically undeteriorated condition, retaining all the flavor and fragrance of the freshly churned product.

The herein described product is the subject of a separate application filed March 16, 1912, Serial No. 684,174.

What I claim as new is:

1. The method of making and preserving butter herein described which consists in, refrigerating butter down to a temperature so much below the freezing point of water as to prevent deteriorating fermentation in the butter, and maintaining said low temperature in the butter from the time of making the butter up to the time immediately prior to the consumption of the butter.

2. The method of making and preserving butter herein described which consists in, refrigerating cream to a sufficient degree to prevent undesirable fermentation in the cream prior to the formation of butter from the cream, churning the cream at a suitable temperature to form butter and immediately after the churning refrigerating the butter produced to a temperature so much below the freezing point of water as to prevent deteriorating fermentative changes in the butter, and which further consists in forming the butter before its delivery to the consumer into thin slabs of approximately the thickness of the butter patty usually served at table to the individual consumer, and enwrapping each thin slab in protective paper to prevent atmospheric and other infection of the butter.

3. The method of making and preserving butter herein described which consists in, subjecting cream and the butter made from the cream, to a temperature both before and after the butter is churned, sufficiently low to prevent undesirable fermentation in the butter, forming and printing the butter into thin slabs of partly divided individual butter patty prints, enwrapping each slab in protective paper, enwrapping a plurality of individual enwrapped slabs in one protective carton, and shipping a plurality of the enwrapped butter packages to market in an insulated shipping case.

4. The method of making and preserving butter herein described which consists in, making butter, immediately refrigerating the butter after its making and before obvious fermentation in the butter has occurred and before its shipment from the place of its making, to a selected temperature at least as low as will prevent fermentation in the butter, and holding the butter at the selected temperature until the consumption of the butter by the consumer is immediately assured.

5. The method of making and preserving butter herein described which consists in, refrigerating cream at the place of its production, conveying the cream in refrigerated condition to a place for its manufacture into butter, warming the cream to a suitable temperature to form butter and making butter from the cream, refrigerating the butter immediately after its making to a temperature sufficiently low to prevent fermentation in the butter, and holding the butter in refrigeration until its consumption is immediately assured.

6. The method of making and preserving butter herein described which consists in, cooling cream, pasteurizing the cream, making butter from the pasteurized cream, immediately refrigerating the pasteurized product after its making into butter to a temperature very much below the freezing point of water, and maintaining the refrigerated product at such a temperature as to prevent fermentation in the butter or bacterial growths on its surface.

7. The method of making and preserving butter herein described which consists in, refrigerating a fluid to a temperature many degrees lower than the freezing point of water, subjecting butter to the influence of the refrigerating fluid immediately after the making of the butter, forming the butter into thin slabs creased and printed to form individual butter patties, subjecting the slabs to the chilling influence of the refrigerated fluid, enwrapping each slab with protective paper, and shipping the chilled butter to market in an insulated packing case.

8. The method of making and preserving butter herein described, which consists in making butter, immediately refrigerating the butter to a temperature at least so low as to substantially bring fermentation in the butter to a standstill, forming the butter into packages for shipping the butter to market, again refrigerating the butter to a temperature so low as to prevent the heating of the butter from atmospheric conditions to an active fermenting temperature during the transit of the butter to market.

9. The method of making and preserving butter herein described which consists in, making butter, forming the butter into prints, refrigerating the prints to a temperature many degrees lower than the freezing point of water, wrapping each print in protective paper, packing a plurality of the enwrapped prints in one protective carton, and shipping the enwrapped and carton protected butter to market in an insulated packing case.

10. The method of making and preserving butter herein described which consists in, subjecting butter at the place of its manufacture, immediately after its production and prior to its shipment to market, to a mechanical refrigeration sufficiently intense to substantially entirely prevent deteriorating fermentation in the butter and such heating of the butter during its shipment as would allow of deteriorating fermentation in the butter during its carriage to market.

11. The method of making and preserving butter herein described which consists in, making butter under temperature influences developing desired flavors in the butter, immediately refrigerating the butter after its making to a temperature sufficiently cold to prevent deteriorating fermentation in the butter while the butter is held at such cold temperature, forming the butter into thin slabs, wrapping the thin slabs in protective coverings for excluding infecting germs and for preventing loss of moisture in the butter, wrapping a plurality of enwrapped slabs in one protective carton, and again subjecting the butter to an intense degree of refrigeration sufficiently below the freezing point of water to prevent deteriorating fermentation in the butter during the transit of the butter to the consumer and prior to the consumption of the butter, the coldness of the temperature to which the butter is refrigerated being determined by the distance from the consumer and the time required to convey the butter to the consumer, and insulating the butter against absorption of heat during the travel of the butter to market.

JOSEPH MOSES WARD KITCHEN.

Witnesses:
  Geo. L. Wheelock,
  Nathan Epstein.